E. A. WHEELER.
COOKING UTENSIL.
APPLICATION FILED AUG. 3, 1916.
1,233,736.
Patented July 17, 1917.
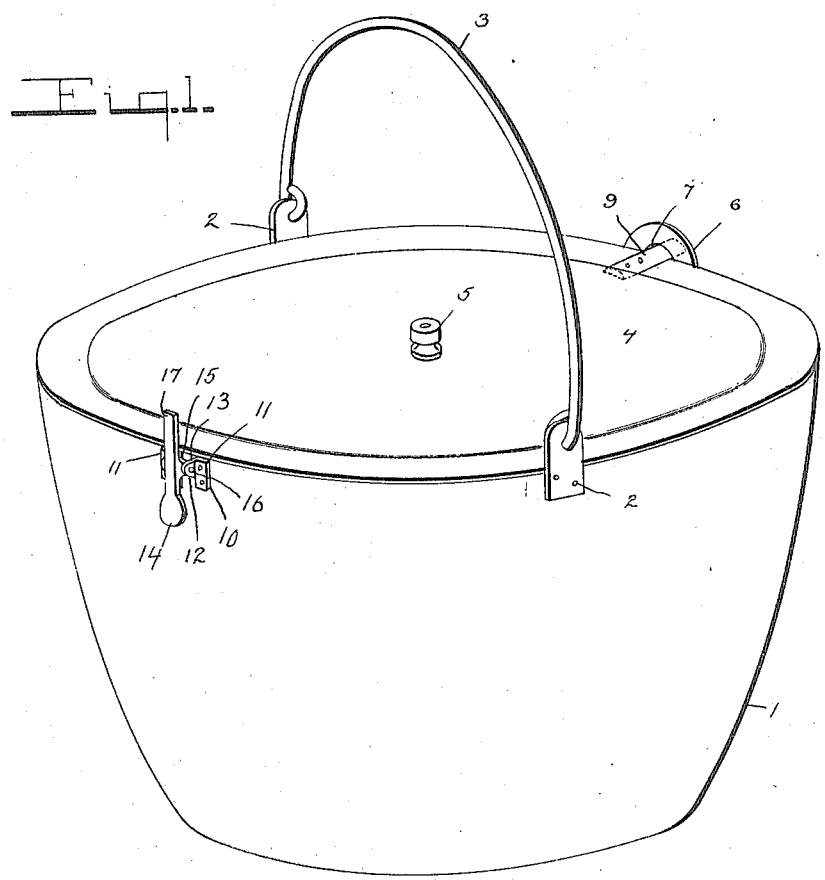
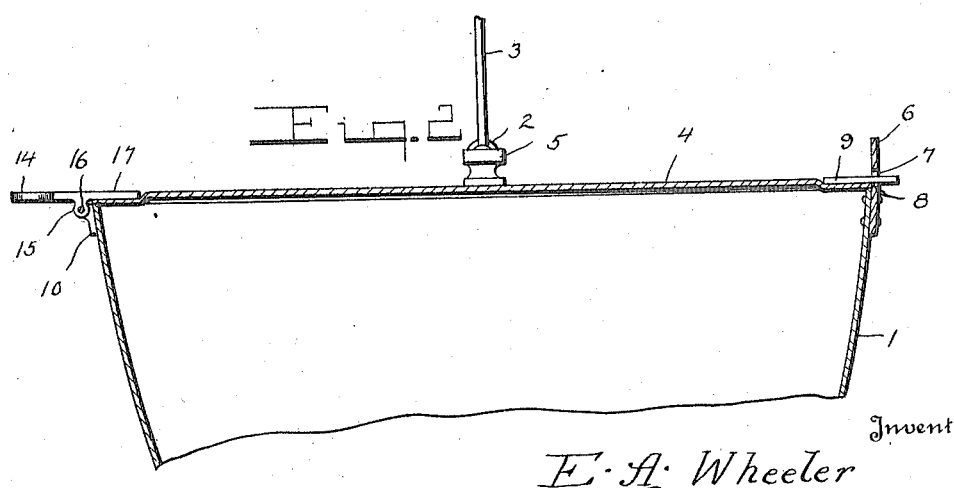

UNITED STATES PATENT OFFICE.

EUGENE A. WHEELER, OF BARRYTON, MICHIGAN.

COOKING UTENSIL.

1,233,736. Specification of Letters Patent. Patented July 17, 1917.

Application filed August 3, 1916. Serial No. 112,994.

*To all whom it may concern:*

Be it known that I, EUGENE A. WHEELER, a citizen of the United States, residing at Barryton, in the county of Mecosta and State of Michigan, have invented certain new and useful Improvements in Cooking Utensils; and I do hereby declare the following to be a full, clear, and exact description of the invention, such as will enable others skilled in the art to which it appertains to make and use the same.

The invention relates to improvements in cooking utensils, and has for an object to improve the construction of cooking utensils, so as to provide a utensil and cover therefor which are provided with means whereby the water may be drained from the contents of the utensil without fear of scalding the hands with the escaping steam.

A further object of this invention is the provision of a pivoted handle carried by the utensil which has a clamping engagement with the cover, so that the water may be quickly and readily drained from the utensil when tilted without fear of the cover slipping from the utensil and scalding the user's hands.

A further object of this invention is to provide a cooking utensil of this character, which will be simple, practical and comparatively inexpensive, that can be manufactured and sold at a comparatively small cost.

With these and other objects in view the invention consists in a novel combination and arrangement of parts hereinafter more fully described and pointed out in the claim hereto appended.

In the drawings.

Figure 1 is a perspective view of my improved cooking utensil made in accordance with my invention, and Fig. 2 is a fragmentary vertical sectional view of the same.

Like numerals of reference designate corresponding parts in all the figures of the drawing.

Referring more particularly to the drawing, 1 designates a body, 2 the ears, 3 the bail and 4 the cover of the kettle of any well known type. The cover is provided with the usual lifting knob 5. The body has secured on its outer surface near its upper peripheral edge the ear 6, which ear is provided with a semicircular opening 7. The ear is arranged centrally between the bail carrying ears 2 of the body. The lower wall of the opening 7 projects slightly above the upper edge of the body 1 as at 8 and is clearly shown in Fig. 2 of the drawing.

The cover 5 has secured to its upper face a pin 9, which pin has one end extending outwardly beyond the edge of the cover and is adapted to extend through the opening 7 of the ear 6 hingedly securing the cover in position on the body.

The body 1 has secured thereto on its outer surface brackets 10, which brackets are arranged at diametrically opposite points from the ears 6. The brackets 10 are arranged at spaced distances apart and are provided with the attaching portions 11 and the lever supporting members 12, which lever supporting members are arranged parallel with each other and at right angles to the attaching portions. The members 12 are provided with alining openings 13 in which is journaled the handle 14.

The handle 14, is provided centrally on one face with an outwardly projecting barrel 15, which barrel is positioned between the members 12, of the brackets 10. A pivot pin 16 extends through the members and barrel of the handle for pivotally holding the handle therein.

The handle 14 is provided with a reduced cover engaging member 17, which is adapted to have a clamping engagement with the cover by upward movement of the handle so that the cover will be held against movement when the body is tilted.

The pin 9 which extends through the opening 7 of the ear 6 is of less diameter than the opening, so as to provide efficient space for the water to be readily and quickly drained from the contents of the kettle when the same is tilted.

In use, the body is filled with water and the articles to be cooked are placed therein the cover is then secured to the body by extending the pin 9 through the opening 7 of the ear 6. After the contents have been sufficiently cooked and it is desired to drain the water therefrom, the bail 3 is grasped by one hand of the operator and with his free hand, he grasps the handle 14; by upward movement of the handle 14, he forces the lever portions 17 into clamping engagement with the cover and the cover is held against any movement other than the slight outward movement at its hinged point and the water is thereby drained from the body upon tilting the same, it being understood that the cover moves outwardly by the force of water against its inner face due to the relative sizes of the opening and pin 9.

What is claimed is:—

A cooking utensil including a body, a bail secured to the body at diametrically opposite points, an ear secured to the upper peripheral edge of said body centrally between the connection of the bail end to the body, said ear provided with a semi-circular opening, a cover arranged on the body, a pin semi-circular in cross section secured to the upper side of the cover and extending beyond the peripheral edge thereof, said pin being of a diameter less than the semi-circular opening in the ear and adapted to extend through said ear for removably securing the cover to the body of a utensil, a pair of brackets secured to the body adjacent the periphery thereof at diametrically opposite points from the ear, a handle journaled intermediate its ends between the brackets one end of said handle adapted to engage the peripheral edge of the cover for permitting only a slight movement of the cover outwardly to permit the contents of the utensils to be drained therefrom, said handle adapted to be lifted upwardly for forcing it into engagement with the cover permitting the slight movement of the cover.

In testimony whereof I affix my signature in presence of two witnesses.

EUGENE A. WHEELER.

Witnesses:
CHARLES W. MACKERSIE,
WILLIAM C. BILYEA.

Copies of this patent may be obtained for five cents each, by addressing the "Commissioner of Patents, Washington, D. C."